US012785270B2

(12) United States Patent
Wang et al.

(10) Patent No.: US 12,785,270 B2
(45) Date of Patent: Nov. 3, 2026

(54) HYBRID MULTI-BEAMFORMING CIRCUIT STRUCTURE

(71) Applicant: Nankai University, Tianjin (CN)

(72) Inventors: Xudong Wang, Tianjin (CN); Xu Zhu, Tianjin (CN); Wei Ma, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 0 days.

(21) Appl. No.: 19/127,918

(22) PCT Filed: Sep. 2, 2024

(86) PCT No.: PCT/CN2024/116225
§ 371 (c)(1),
(2) Date: May 7, 2025

(87) PCT Pub. No.: WO2025/123798
PCT Pub. Date: Jun. 19, 2025

(65) Prior Publication Data

US 2026/0018788 A1 Jan. 15, 2026

(30) Foreign Application Priority Data

Jul. 12, 2024 (CN) ......................... 202410933532.4

(51) Int. Cl.
*H01Q 3/38* (2006.01)
*H01Q 3/28* (2006.01)
*H04B 1/04* (2006.01)
*H04B 7/06* (2006.01)

(52) U.S. Cl.
CPC ................. *H01Q 3/38* (2013.01); *H01Q 3/28* (2013.01); *H04B 1/04* (2013.01); *H04B 7/0617* (2013.01)

(58) Field of Classification Search
CPC .. H01Q 3/28; H01Q 3/30; H01Q 3/34; H01Q 3/36; H01Q 3/38; H04B 1/04; H04B 7/0617
See application file for complete search history.

(56) References Cited

U.S. PATENT DOCUMENTS 9,935,367 B2 * 4/2018 Tiebout ................ H01Q 3/2682
10,256,894 B2 * 4/2019 Eitan ...................... H04B 7/086

OTHER PUBLICATIONS

Decision to Grant in corresponding Chinese Application No. 202410933532.4 mailed on Aug. 24, 2024, 3 pages, including English translation.

* cited by examiner

*Primary Examiner* — Robert Karacsony
(74) *Attorney, Agent, or Firm* — MH2 Technology Law Group LLP

(57) ABSTRACT

The present invention provides a hybrid multi-beamforming circuit structure, including: a power divider receiving a first data stream and dividing it into multiple second data streams; a power combiner receiving the second data streams and combining them into a third data stream; an FTVAP circuit having its input port connected to an output port of the power divider and its output port connected to an input port of the power combiner, to control an amplitude, a phase, and time delay of the second data streams. A BTVAP circuit connected to an input port of the power divider to control an amplitude, a phase, and time delay of the first data stream, or to an output port of the power combiner to control an amplitude, a phase, and time delay of the third data stream.

9 Claims, 11 Drawing Sheets

HYBRID MULTI-BEAMFORMING CIRCUIT STRUCTURE

CROSS-REFERENCE TO RELATED APPLICATIONS

The present application is a national stage entry from International Application No. PCT/CN2024/116225, filed on Sep. 2, 2024, and claims priority to Chinese Patent Application No. 202410933532.4, filed on Jul. 12, 2024, the entire contents of which are incorporated by reference herein in their entireties.

FIELD OF TECHNOLOGY

The present invention relates to the field of beamforming integrated circuits, and in particular to a hybrid multi-beamforming circuit structure.

BACKGROUND

Phased array active antennas have technical advantages such as multi-target tracking, fast beam switching, flexible beamforming, a strong anti-interference capability in spatial filtering, a small size and light weight, and high reliability, which are an important research and development direction in 5G/6G communication, satellite communication, radar and other fields.

Through comparison among analog beamforming, hybrid beamforming, and digital beamforming, fully digital beamforming is theoretically an ultimate solution in the future. However, it is not feasible to use fully digital beamforming (DBF) in a millimeter wave Ku band and above. Constrained by power consumption, efficiency, and costs, an analog-to-digital converter (ADC) does not have a highest sampling frequency and low power consumption. In a band above Ka, and it is difficult to accommodate a size and wiring of a high-performance high-speed ADC in space with a half wavelength. Requirements of the fully DBF for nonlinearity and a dynamic range, a processing capability for digital circuits and a transmission capability for digital interfaces of the fully DBF are all extremely challenging.

Therefore, hybrid beamforming (HFB) utilizes analog beamforming (ABF) sub-arrays for spatial filtering and employs a mixer to reduce an operating frequency required by the ADC, which is an optimal solution in terms of performance, power consumption, and costs. In analog and hybrid beamforming systems, fully connected beamforming, in contrast to partially connected hybrid beamforming (HBF), provides more beam control options, facilitates system performance and algorithm optimization, and provides a greater transmission rate. When a quantity of beams and a quantity of antenna elements of the fully connected BF increases, complexity and power consumption of the BF system increase significantly. Therefore, it is necessary to optimize the design of a circuit structure.

In a broadband application scenario where a phased array radar systems operate, beamforming in a millimeter-wave phased array system needs to use a true time delay (TTD) technology instead of a traditional phase shifter solution to prevent a beam steering error across frequencies. The true time delay technology is a key technology for a broadband phased array, but a TTD circuit is usually much larger than a phase shifter circuit. If great TTD is used in each amplitude and phase control channel of a multi-channel and multi-beam system, an overall circuit size and corresponding costs are considerably great.

SUMMARY

The present invention is intended to resolve at least one of technical problems existing in the prior art. Therefore, the present invention provides a hybrid multi-beamforming circuit structure.

The present invention provides a hybrid multi-beamforming circuit structure, including:

- a power divider, receiving a first data stream for dividing the first data stream into a plurality of second data streams;
- a power combiner, receiving the second data streams and combining the plurality of second data streams into a third data stream;
- a fine tuning with VAP (FTVAP) circuit, where an input port of the FTVAP circuit is connected to an output port of the power divider, and an output port of the FTVAP circuit is connected to an input port of the power combiner, to control an amplitude, a phase, and time delay of the second data streams; and
- a beam tuning with VAP (BTVAP) circuit, where the BTVAP circuit is connected to an input port of the power divider to control an amplitude, a phase, and time delay of the first data stream, or the BTVAP circuit is connected to an output port of the power combiner to control an amplitude, a phase, and time delay of the third data stream.

The present invention provides a hybrid multi-beamforming circuit structure, further including: both the FTVAP circuit and the BTVAP circuit adjust an amplitude through an amplitude modulation circuit, the FTVAP circuit performs phase adjustment through a numerical control phase shifter, the BTVAP circuit performs time delay adjustment through a numerical control true time delay circuit, the FTVAP circuit performs small-step accurate time delay adjustment through the numerical control true time delay circuit, and the BTVAP circuit performs large-step time delay adjustment through the numerical control true time delay circuit.

The present invention provides a hybrid multi-beamforming circuit structure, further including: a first data stream amplifier and a third data stream amplifier, where an output port of the first data stream amplifier is connected to the input port of the power divider, an input port of the third data stream amplifier is connected to an output port of the BTVAP circuit, or the output port of the first data stream amplifier is connected to an input port of the BTVAP circuit, and the input port of the third data stream amplifier is connected to the output port of the power combiner.

The present invention provides a hybrid multi-beamforming circuit structure, further including an impedance transformation circuit, where the impedance transformation circuit is cascaded with the power divider to match an output impedance of the power divider with an input impedance of the FTVAP circuit; and the impedance transformation circuit is cascaded with the power combiner to match an output impedance of the FTVAP circuit with an input impedance of the power combiner.

The present invention provides a hybrid multi-beamforming circuit structure, further including: an input impedance of the power divider matches an output impedance of the BTVAP circuit, and an output impedance of the power combiner matches a port impedance of the third data stream.

The present invention provides a hybrid multi-beamforming circuit structure, further including: an input impedance of the power divider matches a port impedance of the first data stream, and an output impedance of the power combiner matches an input impedance of the BTVAP circuit.

The present invention provides a hybrid multi-beamforming circuit structure, further including: a low-input impedance amplifier, where an input port of the low-input impedance amplifier is connected to an output port of the power combiner, an output port of the low-input impedance amplifier is connected to the third data stream or the input port of the low-input impedance amplifier is connected to an output port of the BTVAP circuit, and the output port of the low-input impedance amplifier is connected to the third data stream.

The present invention provides a hybrid multi-beamforming circuit structure, further including: the first data stream is a radiation source and the third data stream is a beam, or the first data stream is a beam, and the third data stream is a radiation source.

The present invention provides a hybrid multi-beamforming circuit structure, further including: a numerical control true time delay circuit, where the numerical control true time delay circuit is a T-coils structure.

The present invention provides a hybrid multi-beamforming circuit structure, further including: each of a port impedance of the numerical control true time delay circuit, a port impedance of the numerical control phase shifter, and a port impedance of an amplitude modulation circuit is less than 50Ω.

The above technical solution or technical solutions in the embodiments of the present invention have at least one of the following technical effects:

According to the needs of signal control, the power divider is placed at a near input port, and the power combiner and tuning with VAP circuits are placed at a near output port. In addition, based on different impedances of device ports, different impedance transformation modules are selected to be inserted into the structure respectively to reduce the insertion loss and circuit area of the tuning with VAP circuits without unnecessary additional insertion loss. If the insertion loss is not increased, and phase shift accuracy or time delay accuracy of the traditional circuit is not changed, a lower occupied area of the multi-beam circuit is achieved through a tuning with VAP circuit with large-step accuracy or a tuning with VAP circuit with small step accuracy, and other performance of the circuit is not changed. Therefore, the structure is simple and proper, which greatly improves an integration degree and reduces the cost compared with a same type of circuit. The hybrid multi-beamforming circuit structure of the present invention is used in a phased array to implement multi-beamforming and beam scanning, so that the FTVAP circuit and the BTVAP circuit have lower power consumption under a low impedance condition.

Additional aspects and advantages of the present invention will be set forth in a part of the following description, and the part will be obvious from the following description, or may be learned by practice of the present invention.

BRIEF DESCRIPTION OF THE DRAWINGS

To describe technical solutions in the present invention or in the prior art more clearly, the following briefly describes accompanying drawings required for describing the embodiments or the prior art. Apparently, the accompanying drawings in the following description show some embodiments of the present invention, and a person of ordinary skill in the art may derive other drawings from these accompanying drawings without creative efforts.

DESCRIPTION OF THE EMBODIMENTS

Figure 1:
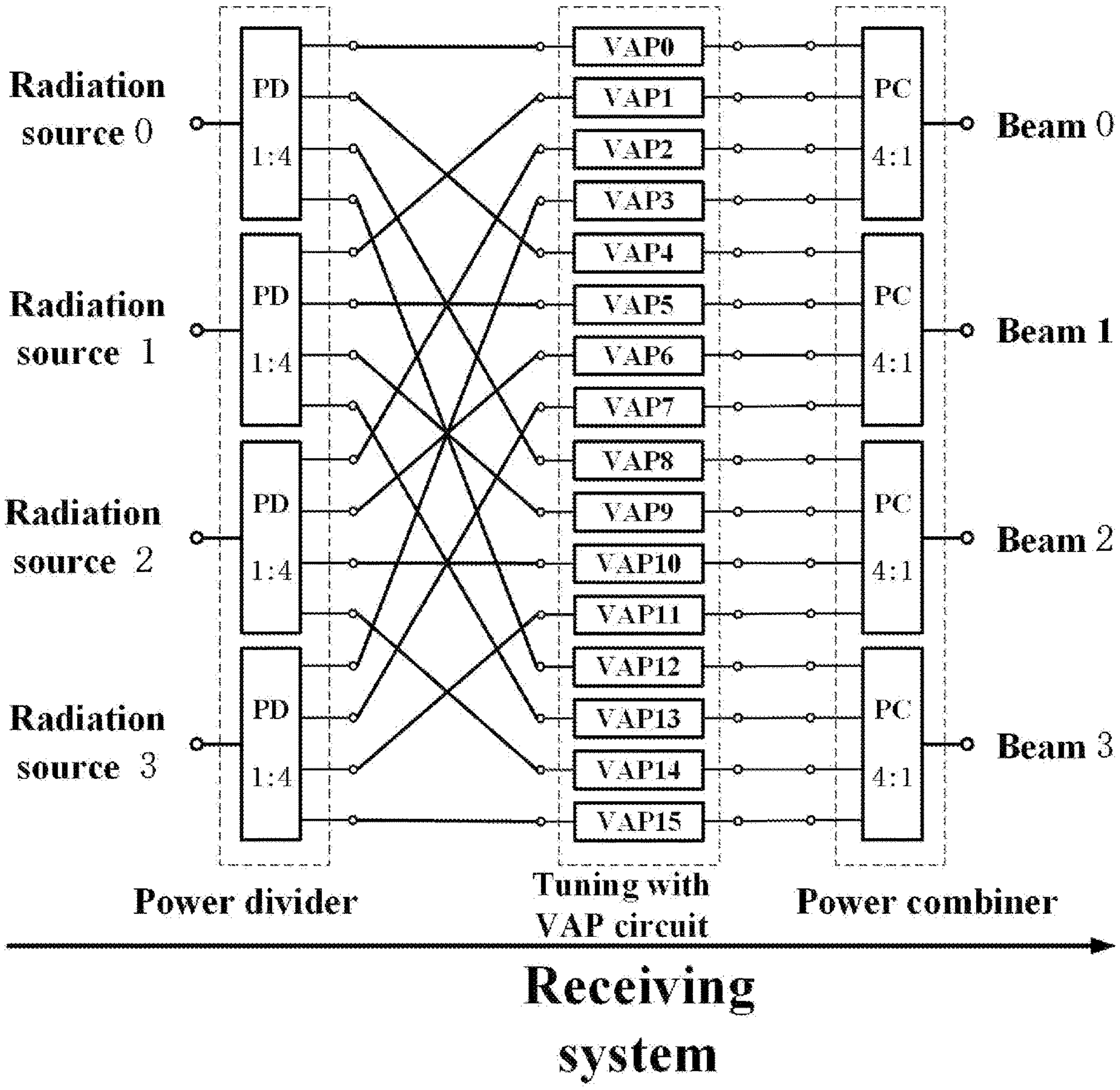
FIG. 1 is a traditional structure of a multi-beam receiving system of a hybrid multi-beamforming circuit structure according to the present invention.

To make the objectives, technical solutions, and advantages of the present invention clearer, the following clearly and completely describes the technical solutions in the present invention with reference to the accompanying drawings in the present invention. It is clear that the described embodiments are merely some rather than all of the present invention. All other embodiments obtained by a person of ordinary skill in the art based on the embodiments of the present application without creative efforts shall fall within the protection scope of the present application. The following embodiments are used to describe the present invention, but are not used to limit the scope of the present invention.

In descriptions of embodiments of the present invention, it should be noted that terms “first”, “second”, and “third” are merely intended for description, and shall not be understood as an indication or implication of relative importance. Unless otherwise expressly stipulated and defined, terms “connected” and “connect”, should be understood in a broad sense. For example, "connection" may be a firm connection, a detachable connection, or an integral connection; may be a mechanical connection, or an electrical connection; or may be a direct connection, an indirect connection through an intermediate medium. A person of ordinary skill in the art can understand specific meanings of the terms in the embodiments of present invention based on specific situations.

In this specification, illustrative expressions of these terms do not necessarily mean a same embodiment or example. Moreover, the specific feature, structure, material, or characteristic described may be combined in any suitable manner in any one or more embodiments or examples. In addition, those skilled in the art may combine and group different embodiments or examples described in this specification, as well as the features of different embodiments or examples, without conflicting with each other.

A hybrid multi-beamforming circuit structure in the present invention is described below with reference to FIG. 1 to FIG. 13. Based on needs of signal control, a power divider is disposed at an input port, a power combiner is disposed at an output port, and a FTVAP circuit and a BTVAP circuit are disposed for completing beamforming based on a signal transmission direction. The power divider receives a first data stream and equally divides the first data stream into a plurality of second data streams. The power combiner receives the second data streams and combines the plurality of second data streams into a third data stream. An input port of an FTVAP circuit is connected to an output port of the power divider, and an output port of the FTVAP circuit is connected to an input port of the power combiner, to control an amplitude, a phase, and time delay of the second data streams. The BTVAP circuit is connected to an input port of the power divider to control an amplitude, a phase, and time delay of the first data stream, or the BTVAP circuit is connected to an output port of the power combiner to control an amplitude, a phase, and time delay of the third data stream.

In the hybrid multi-beamforming circuit structure of the present invention, the power divider receives the first data stream and equally divides the first data stream into the plurality of second data streams, and the amplitude, phase, and time delay of each second data stream is controlled by the FTVAP circuit. The power combiner receives the plurality of second data streams controlled by the FTVAP circuit and combines the plurality of second data streams into the third data stream, and implements multi-beamforming and beam scanning through the FTVAP circuit and the BTVAP circuit.

Further, the hybrid multi-beamforming circuit structure further includes a first data stream amplifier and a third data stream amplifier. An output port of the first data stream amplifier is connected to the input port of the power divider, an input port of the third data stream amplifier is connected to an output port of the BTVAP circuit, or the output port of the first data stream amplifier is connected to an input port of the BTVAP circuit, and the input port of the third data stream amplifier is connected to the output port of the power combiner.

The circuit structure of the present invention is configured to amplify input and output signals, so that adjustment accuracy of a circuit is improved.

Further, based on different impedances of device ports, different impedance transformation circuits are selected to be inserted into the structure to reduce insertion loss and circuit areas of the FTVAP circuit and the BTVAP circuit. The impedance transformation circuit is configured to convert a high impedance of the FTVAP circuit into a low impedance required for the FTVAP circuit.

The impedance transformation circuit is cascaded with the power divider to match an output impedance of the power divider with an input impedance of the FTVAP circuit. The impedance transformation circuit is cascaded with the power combiner to match an output impedance of the FTVAP circuit with an input impedance of the power combiner.

An input impedance of the power divider matches an output impedance of the BTVAP circuit, and an output impedance of the power combiner matches a port impedance of the third data stream.

The input impedance of the power divider matches a port impedance of the first data stream, and the output impedance of the power combiner matches an input impedance of the BTVAP circuit.

The input impedance of the power divider is greater than the output impedance, and the input impedance of the power combiner is less than the output impedance.

Further, the power divider and the power combiner are Wilkinson circuit structures.

Further, the impedance transformation circuit includes any one of n:1 transformers, $\lambda/4$ transmission lines, amplifiers, hybrids, and power dividers.

The circuit structure in the present invention is used as a receiving system, the first data stream is a radiation source, an input port is connected to the radiation source, the third data stream is a beam, an output port is connected to the beam, the input impedance of the power divider is greater than the output impedance, and the input impedance of the power combiner is less than the output impedance.

When the input impedance of the BTVAP circuit matches the output impedance of the power combiner, an output port of the BTVAP circuit matches a port impedance of a beam source, and the port impedance of the beam source is 50Ω.

The input impedance of the FTVAP circuit matches the output impedance of the power divider, and the output impedance of the FTVAP circuit matches the input impedance of the power combiner.

The input impedance of the power divider matches the impedance of the radiation source, and the output impedance of the power divider matches the input impedance of the FTVAP circuit.

Further preferably, if a characteristic impedance of the FTVAP circuit is less than a standard characteristic impedance, and the standard characteristic impedance is 50Ω, the impedance transformation circuit needs to be inserted into the power divider, or the impedance transformation circuit needs to be cascaded between the power divider and the FTVAP circuit, so that an impedance of the power divider matches an impedance of the FTVAP circuit.

An impedance of a single input port of the power combiner matches the output impedance of the FTVAP circuit, and the output impedance of the power combiner is required to match the input impedance of the BTVAP circuit.

Further, if a characteristic impedance of the BTVAP circuit and the characteristic impedance of the FTVAP circuit are separately less than the standard characteristic impedance, and the standard characteristic impedance is 50Ω, the impedance transformation circuit needs to be inserted into the power combiner, or the impedance transformation circuit and the power combiner are cascaded together, so that the output impedance of the FTVAP circuit matches the input impedance of the power combiner, and the input impedance of the BTVAP circuit matches the output impedance of the power combiner.

Further, the circuit structure in the present invention is used as a transmitting system, the first data stream is a beam, the input port is connected to the beam, the third data stream is the radiation source, the output port is connected to the radiation source, the input impedance of the power divider is greater than the output impedance, and the input impedance of the power combiner is less than the output impedance.

The output impedance of the BTVAP circuit matches the input impedance of the power divider, and the input impedance of the BTVAP circuit matches a port impedance of the beam source, and the port impedance of the beam source is 50Ω.

The input impedance of the FTVAP circuit matches the output impedance of the power divider, and the output impedance of the FTVAP circuit matches the input impedance of the power combiner.

The input impedance of the power divider matches the output impedance of the BTVAP circuit, and the output impedance of the power divider is required to match the input impedance of the FTVAP circuit.

Further, if a characteristic impedance of the BTVAP circuit and the characteristic impedance of the FTVAP circuit are separately less than the standard characteristic impedance, and the standard characteristic impedance is 50Ω, the impedance transformation circuit needs to be inserted into the power divider, or the impedance transformation circuit and the power divider are cascaded together, so that the output impedance of the BTVAP circuit matches the input impedance of the power divider, and the input impedance of the FTVAP circuit matches the output impedance of the power divider.

The input impedance of the power combiner matches the output impedance of the FTVAP circuit, and the output impedance of the power combiner matches a port impedance of the radiation source, and the port impedance of the radiation source is 50Ω.

Further preferably, if a characteristic impedance of the FTVAP circuit is less than a standard characteristic impedance, and the standard characteristic impedance is 50Ω, the impedance transformation circuit needs to be inserted into the power combiner, or cascaded with the power combiner, so that the output impedance of the FTVAP circuit matches the input impedance of the power combiner.

Furthermore, a numerical control true time delay circuit is a T-coils structure, and preferably, the numerical control true time delay circuit is a bridged T-coils structure.

Further, the true time delay circuit includes a transmission line structure, a slow-wave transmission line structure, or an artificial transmission line structure.

Further, each of a port impedance of the numerical control true time delay circuit, a port impedance of a phase shifter, and a port impedance of an amplitude modulation circuit is less than 50Ω.

As shown in FIG. 1, a traditional structure of a hybrid multi-beamforming circuit receiving system includes a radiation source 0, a radiation source 1, a radiation source 2, a radiation source 3, four 1:4 power dividers (PD), tuning with VAP circuits VAP0-VAP15 under 16 digital control modules, four 4:1 power combiners (PC), a beam 0, a beam 1, a beam 2, a beam 3, and an interstage matching network. In addition, each of a port impedance of the power divider (PD) and a port impedance of the power combiner (PC) is 50Ω. Input ports of the four power dividers (PD) are connected to the radiation source 0, the radiation source 1, the radiation source 2, and the radiation source 3 respectively. Output ports of the four power dividers (PDs) are connected to the tuning with VAP circuits VAP0-VAP15 under 16 digital control modules. Each amplitude and phase control circuit controls one path of signals, and circuit structures of the tuning with VAP circuits VAP0-VAP15 are the same. Different amplitude and phase adjustment paths are gated by different digital control signals, and an input port of each power combiner (PC) is connected to output ports of four tuning with VAP circuits, and output ports of the four power combiners (PCs) are connected to the beam 0, the beam 1, the beam 2, and the beam 3 respectively.

Figure 2:
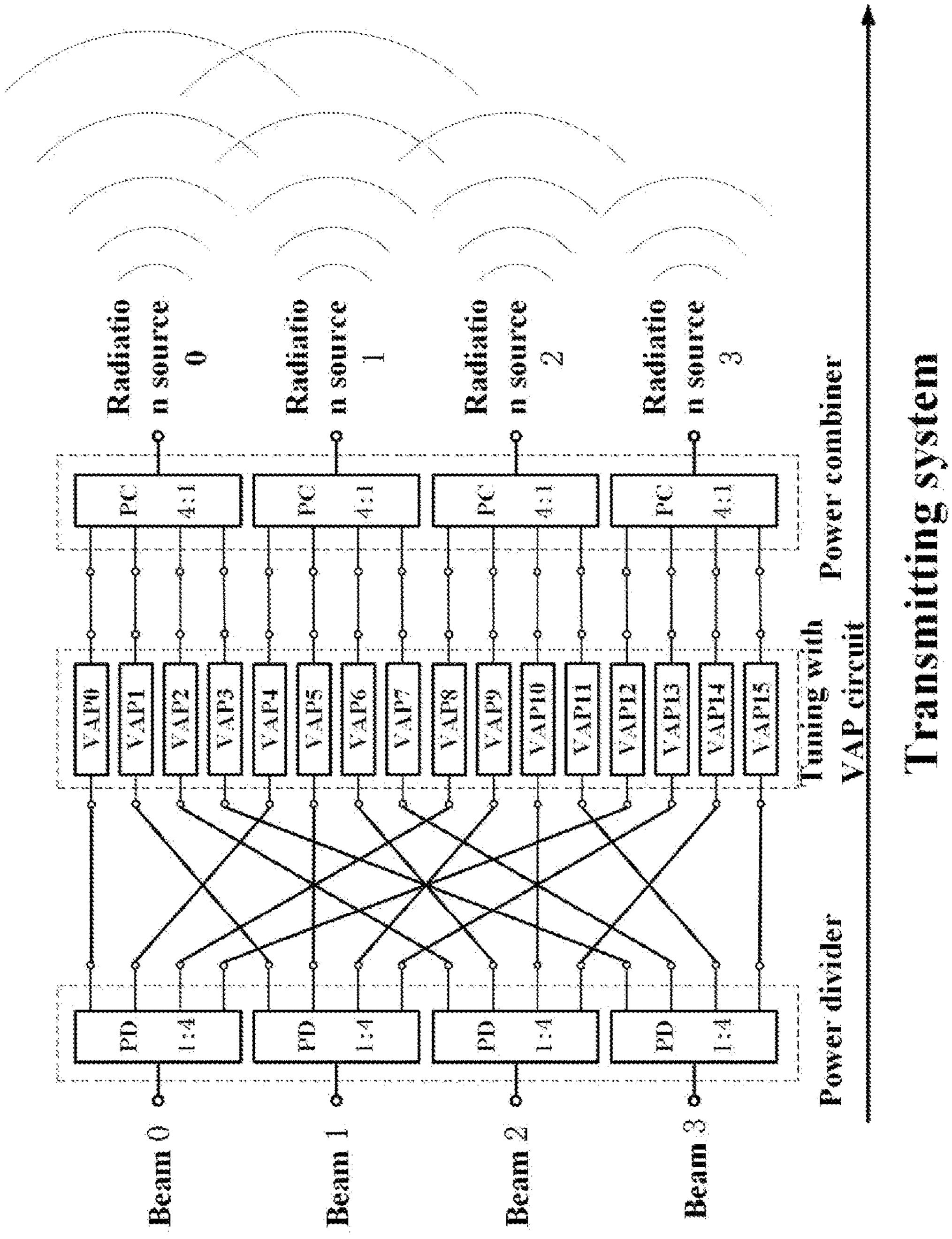
FIG. 2 is a traditional structure of a multi-beam transmitting system of a hybrid multi-beamforming circuit structure according to the present invention.

As shown in FIG. 2, a traditional structure of a hybrid multi-beamforming circuit transmitting system includes four power dividers (PDs) that divide a beam 0, a beam 1, a beam 2, and a beam 3 into four beams respectively, tuning with VAP circuits VAP0-VAP15 under 16 digital control modules, four power combiners (PCs) that superimpose signals through amplitude and phase processing to form radiation source 0-radiation source 3, and an interstage matching network. In addition, each of a port impedance of the power divider (PD) and a port impedance of the power combiner (PC) is 50Ω. The four power dividers (PDs) divide the four beams into 16 signals, each amplitude and phase control circuit controls one path of signals, circuit structures of the VAP0-VAP15 are the same, and different amplitude and phase adjustment paths are gated by different digital control signals.

A traditional structure of the tuning with VAP circuits of the hybrid multi-beamforming circuit transmitting system and a traditional structure of a hybrid multi-beamforming circuit receiving system are controlled in each channel, resulting in large system areas and great costs.

Figure 3:
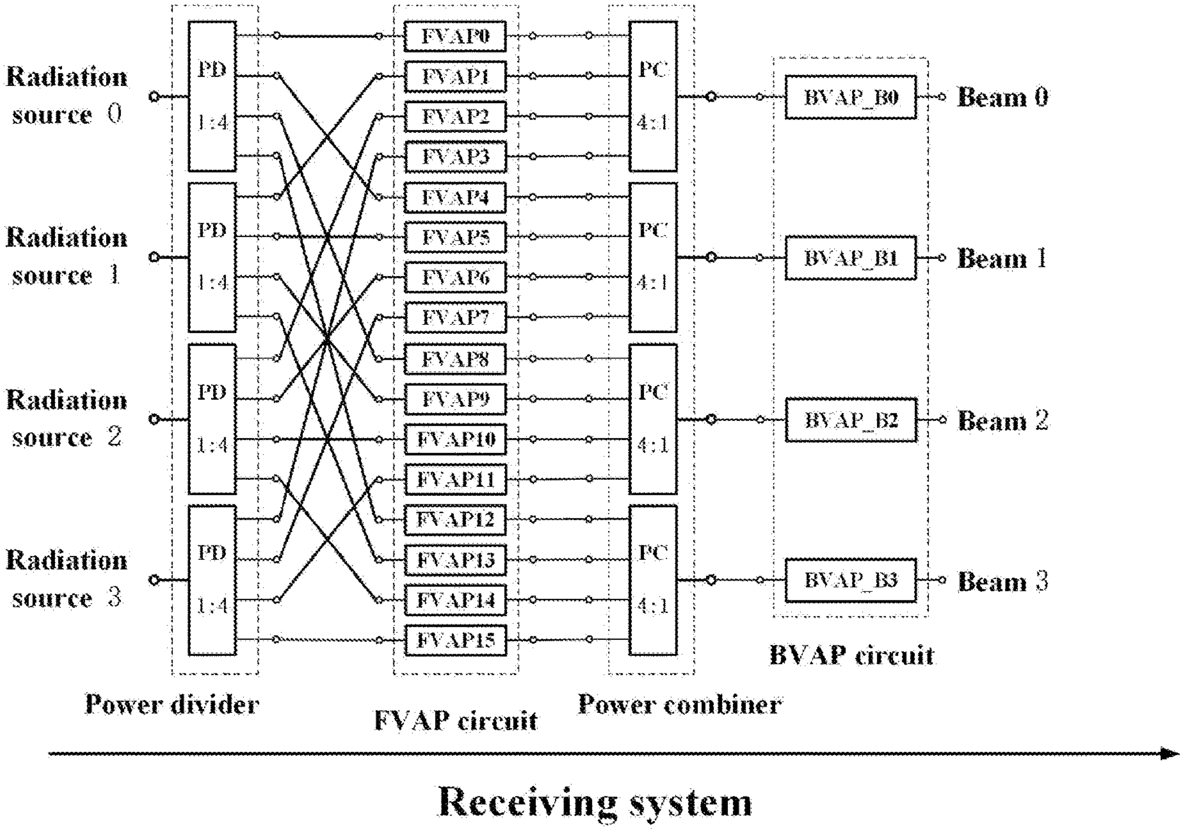
FIG. 3 is a schematic diagram of a receiving system circuit structure of a hybrid multi-beamforming circuit structure according to the present invention.

As shown in FIG. 3, in a receiving system circuit structure of the hybrid multi-beamforming circuit structure of the present invention, based on the traditional structure shown in FIG. 1, tuning with VAP circuits VAP0-VAP15 are disposed as FTVAP circuits FTVAP0-FTVAP15 of small steps. In addition, BTVAP circuits BTVAP_B0-BTVAP_B3 with great steps and phases are disposed in beam channels. A characteristic impedance of the FTVAP circuits FTVAP0-FTVAP15 and a characteristic impedance of the BTVAP circuits BTVAP_B0-BTVAP_B3 are equal, the characteristic impedance is 50Ω, and good impedance matching is provided between the circuits. One BTVAP is shared between a plurality of beam signal channels, so that the system areas can be reduced and the costs can be reduced.

Figure 4:
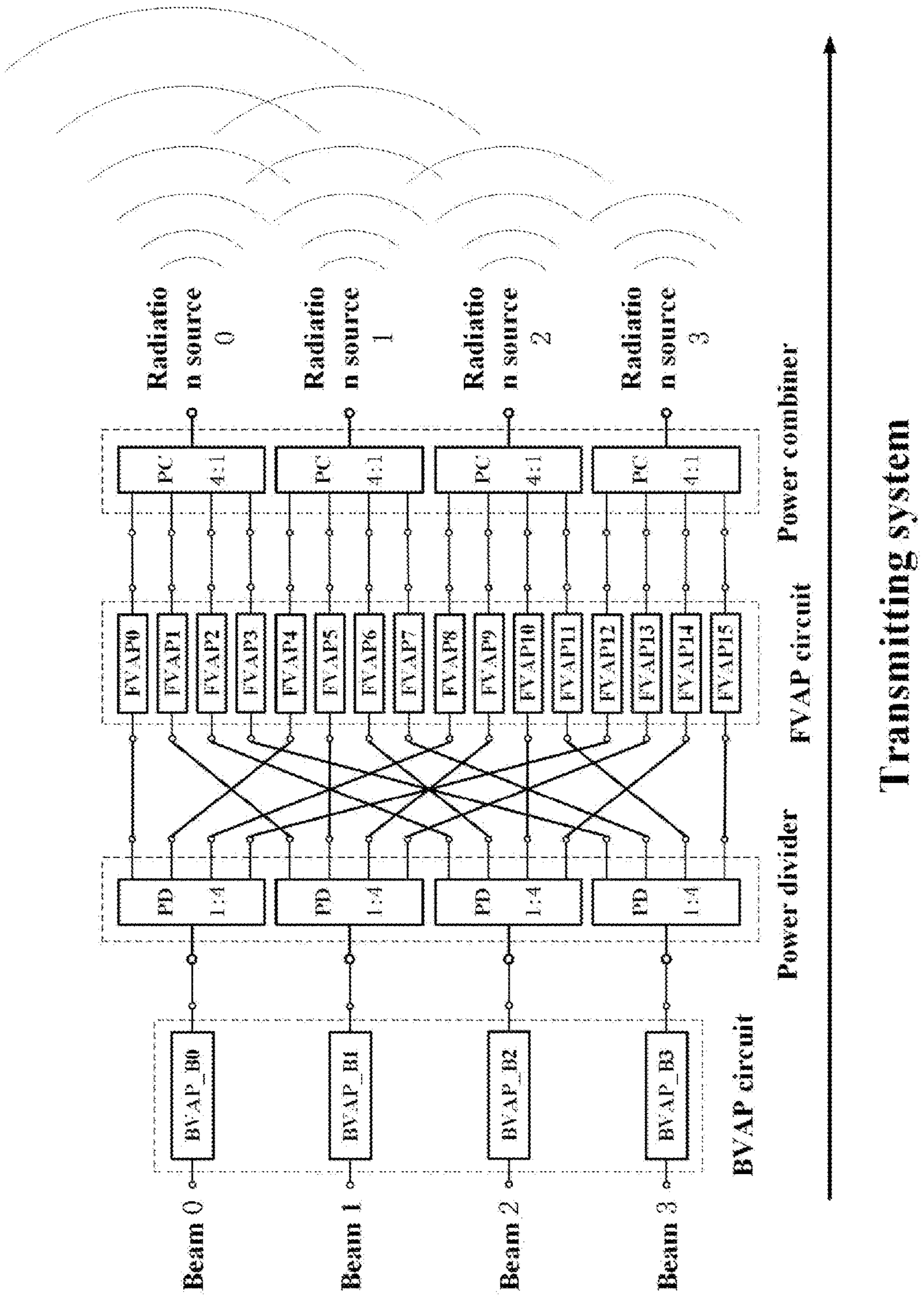
FIG. 4 is a schematic diagram of a transmitting system circuit structure of a hybrid multi-beamforming circuit structure according to the present invention.

As shown in FIG. 4, in a transmitting system circuit structure of the hybrid multi-beamforming circuit structure of the present invention, based on the traditional structure shown in FIG. 2, VAP circuits VAP0-VAP15 are disposed as FTVAP circuits FTVAP0-FTVAP15 of small steps. In addition, BTVAP circuits BTVAP_B0-BTVAP_B3 with great steps and phases are disposed in beam channels. A characteristic impedance of the FTVAP circuits FTVAP0-FTVAP15 and a characteristic impedance of the BTVAP circuits BTVAP_B0-BTVAP_B3 are equal, the characteristic impedance is 50Ω, and good impedance matching is provided between the circuits. One BTVAP is shared between a plurality of beam signal channels, so that the system areas can be reduced and the costs can be reduced.

Figure 5:
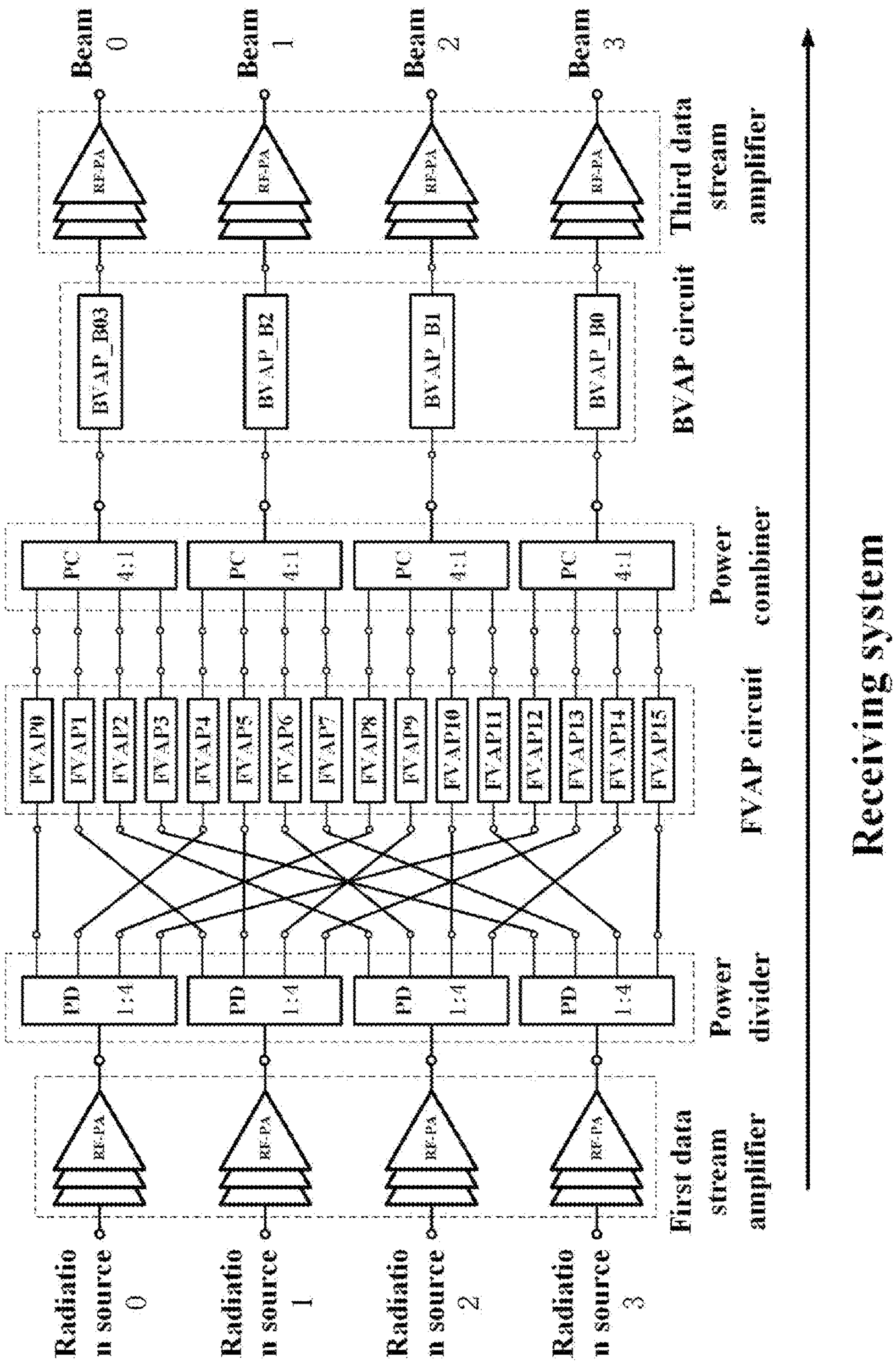
FIG. 5 is a schematic diagram of a receiving system circuit structure with an amplifier of a hybrid multi-beamforming circuit structure according to the present invention.
Figure 12:
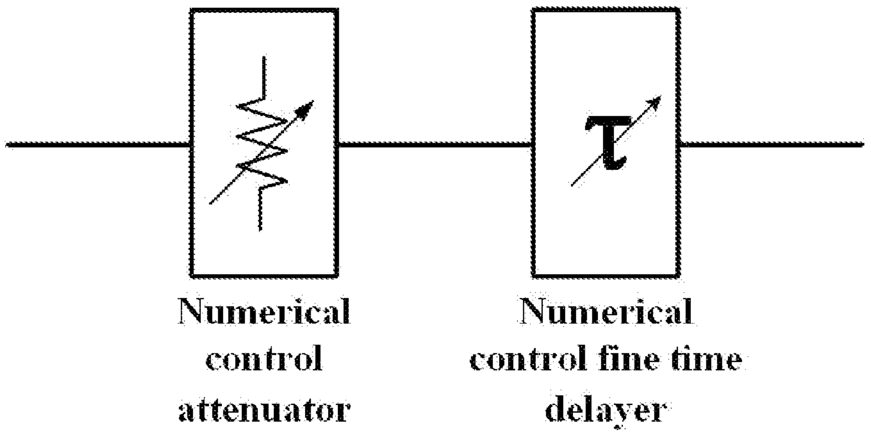
FIG. 12 is a schematic diagram of a circuit structure with numerical control attenuation fine time delay of the FTVAP of a hybrid multi-beamforming circuit structure according to the present invention.
Figure 13:
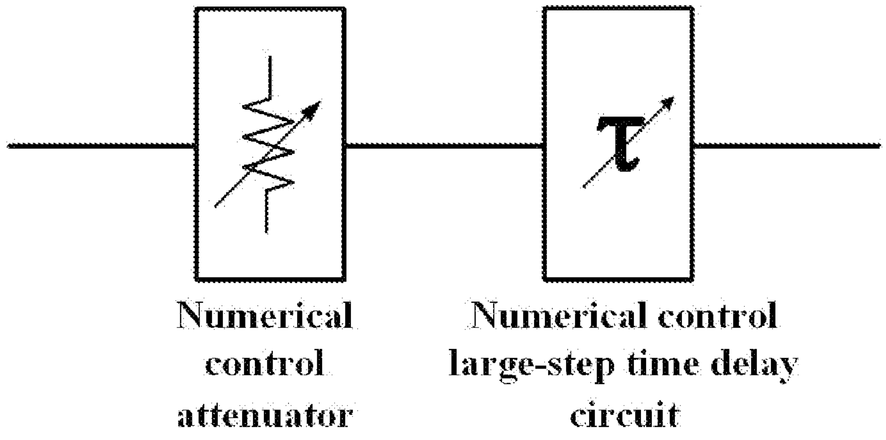
FIG. 13 is a schematic diagram of a circuit structure of a numerical control attenuation large-step time delay of BTVAP of a hybrid multi-beamforming circuit structure according to the present invention.

As shown in FIG. 5, a receiving system circuit structure of a hybrid multi-beamforming circuit structure with an amplifier is provided, based on the circuit structure shown in FIG. 3, a first data stream amplifier is added to signal channels of a radiation source and a power divider (PD) to amplify a radiation source signal, and a third data stream amplifier is added to signal channels of a BTVAP circuit and a beam to amplify a beam signal. Preferably, both the first data stream amplifier and the third data stream amplifier are RF amplifiers RF-PA. Optionally, the power divider (PD) has a single input port and a plurality of output ports, and each port characteristic impedance is 50Ω. The power combiner (PC) has a plurality of input ports and a single output port, and each port characteristic impedance is 50Ω. FTVAP circuits FTVAP0-FTVAP15 are fine-tuned as antenna elements, which can be controlled by a numerical control attenuation phase shifter shown in FIG. 11 and a numerical control attenuation fine time delay circuit shown in FIG. 12, so that amplitude and phase step values thereof are more accurate. BTVAP circuits BTVAP_B0-BTVAP_B3 perform coarse tuning on beams, and a numerical control attenuation large-step time delay circuit as shown in FIG. 13 can be used, with greater amplitude and phase or time delay step values and a larger circuit area.

Figure 6:
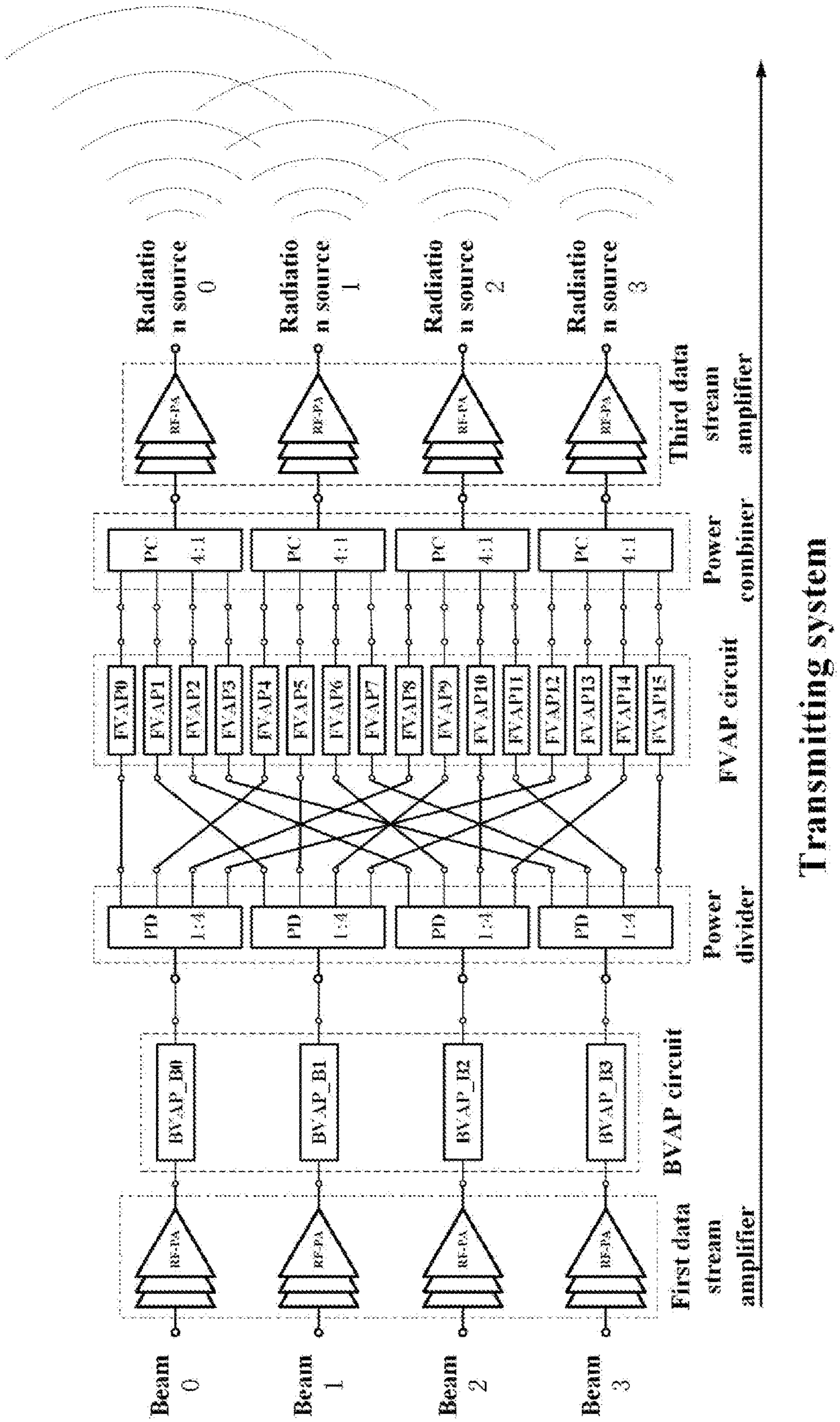
FIG. 6 is a schematic diagram of a transmitting system circuit structure with an amplifier of a hybrid multi-beamforming circuit structure according to the present invention.

As shown in FIG. 6, a transmitting system circuit structure of a hybrid multi-beamforming circuit structure with an amplifier is provided, based on the circuit structure shown in FIG. 4, a first data stream amplifier is added to signal channels of beams and tuning with VAP circuits to amplify beam signals, and a third data stream amplifier is added to signal channels of a power combiner and a radiation source to amplify radiation source signals. Preferably, the first data stream amplifier and the third data stream amplifier are both RF amplifiers RF-PA. Optionally, the power divider (PD) has a single input port and a plurality of output ports, and each port characteristic impedance is 50Ω. The power combiner (PC) has a plurality of input ports and a single output port, and each port characteristic impedance is 50Ω. FTVAP circuits FTVAP0-FTVAP15 are fine-tuned as antenna elements, which can be controlled by a numerical control attenuation phase shifter shown in FIG. 11 and a numerical control attenuation fine time delay circuit shown in FIG. 12, so that amplitude and phase step values thereof are more accurate. BTVAP circuits BTVAP_B0-BTVAP_B3 perform coarse tuning on beams, and a numerical control attenuation large-step time delay circuit as shown in FIG. 13 can be used, with greater amplitude and phase or time delay step values and a larger circuit area.

Figure 7:
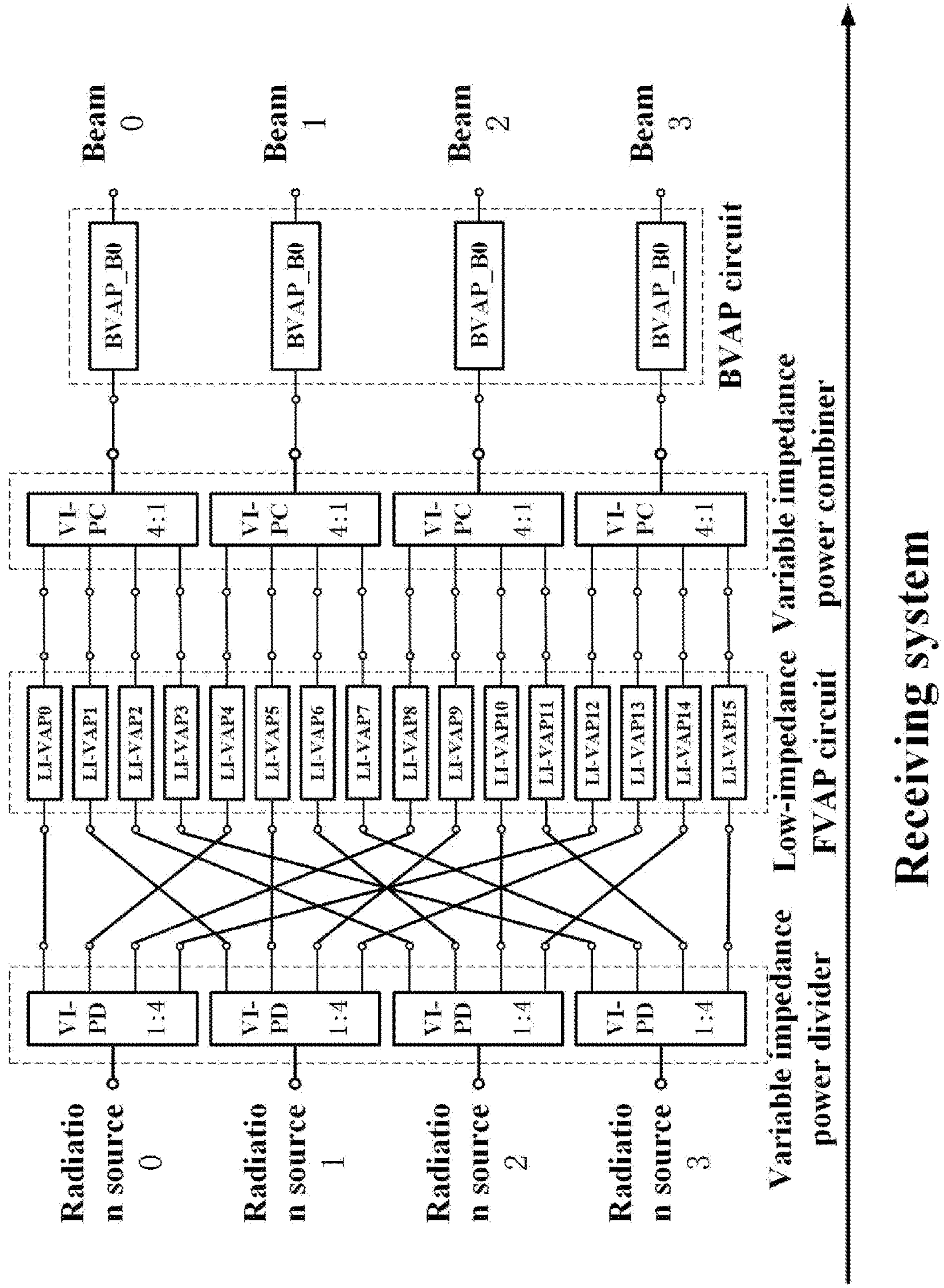
FIG. 7 is a schematic diagram of a receiving system circuit structure based on impedance transformation of a hybrid multi-beamforming circuit structure according to the present invention.

As shown in FIG. 7, a receiving system circuit structure of a hybrid multi-beamforming circuit structure with impedance transformation is provided, based on the circuit structure shown in FIG. 3, an impedance transformation module is added for the power combiner (PC) and the power divider (PD), the power divider (PD) is disposed as a variable impedance power divider VI-PD, and an input impedance Z0 of the variable impedance power divider VI-PD is greater than an output impedance Z1 of the variable impedance power divider VI-PD, where Z0=50Ω. The power combiner (PC) is disposed as a variable impedance power combiner VI-PC, and an input impedance R0 of the variable impedance power combiner VI-PC is less than an output impedance R1 of the variable impedance power combiner VI-PC module, where R1=50Ω.

The FTVAP circuit in the circuit structure shown in FIG. 3 is divided into low-impedance fine numerical tuning with VAP circuits LI-VAP0-LI-VAP15 with small steps, a characteristic impedance of each of the BTVAP circuits BTVAP_B0-BTVAP_B3 is 50Ω. A characteristic impedance of each of the LI-VAP0-LI-VAP15 is consistent with the input impedance of the variable impedance power combiner VI-PC. The characteristic impedance of each of the LI-VAP0-LI-VAP15 is consistent with the output impedance of the variable impedance power divider VI-PD. One BTVAP is shared between a plurality of beam signal channels, so that the system areas can be reduced and the costs can be reduced. In addition, a size of a numerical control true time delay circuit at a low impedance is also greatly reduced, and there is no obvious change in insertion loss.

Figure 8:
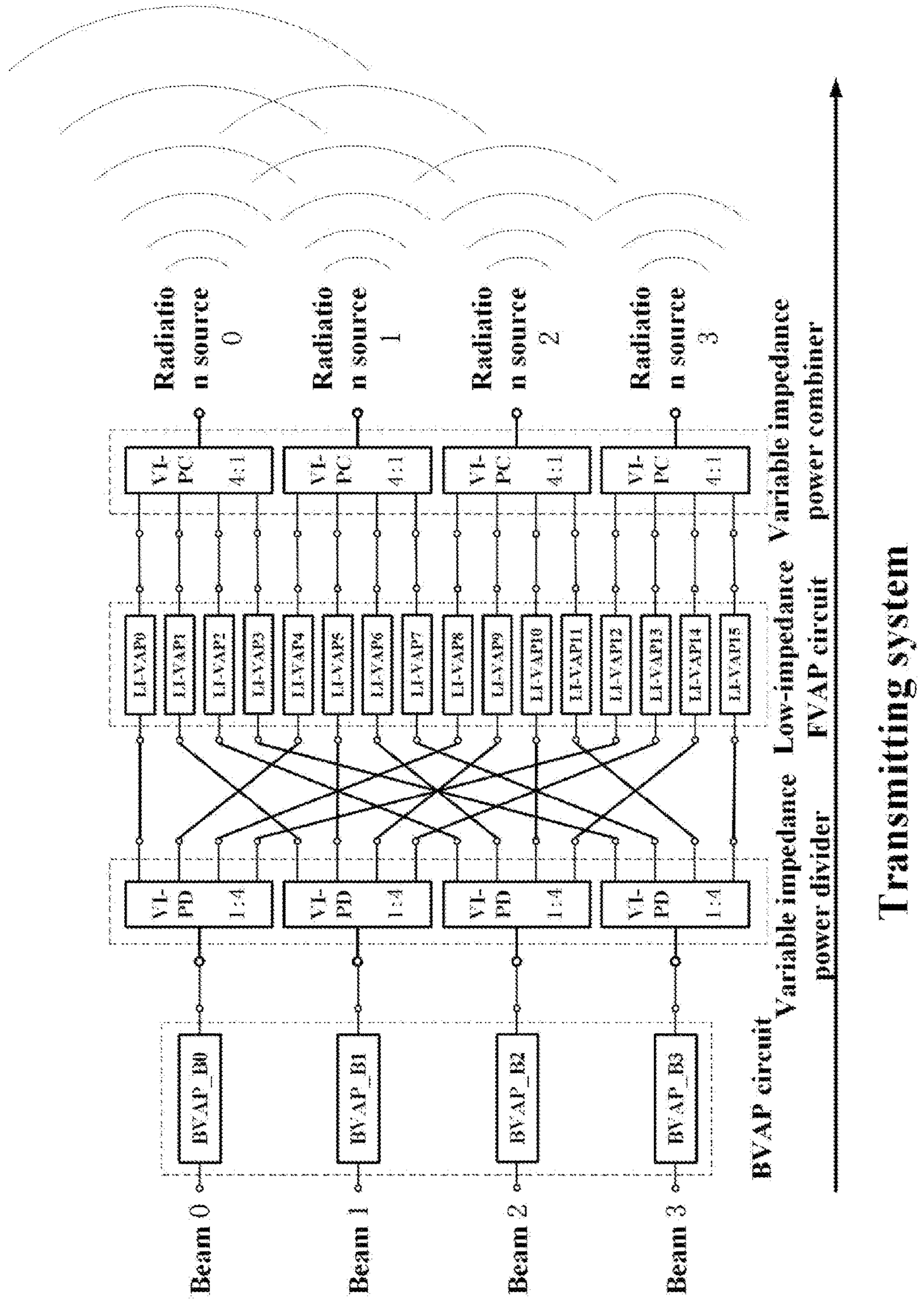
FIG. 8 is a schematic diagram of a transmitting system circuit structure based on impedance transformation of a hybrid multi-beamforming circuit structure according to the present invention.

As shown in FIG. 8, a transmitting system circuit structure of a hybrid multi-beamforming circuit structure with impedance transformation is provided, based on the circuit structure shown in FIG. 4, an impedance transformation circuit is added for the power combiner (PC) and the power divider (PD), the power divider (PD) is disposed as a variable impedance power divider VI-PD, and an input impedance Z0 of the variable impedance power divider VI-PD is greater than an output impedance Z1 of the variable impedance power divider VI-PD, where Z0=50Ω. The power combiner (PC) is disposed as a variable impedance power combiner VI-PC, and an input impedance R0 of the variable impedance power combiner VI-PC is less than an output impedance R1 of the variable impedance power combiner VI-PC, where R1=50Ω.

The FTVAP circuit in the circuit structure shown in FIG. 4 is divided into low-impedance FTVAP circuits LI-VAP0-LI-VAP15 with small steps, a characteristic impedance of each of the BTVAP circuits BTVAP_B0-BTVAP_B3 is 50Ω. A characteristic impedance of each of the LI-VAP0-LI-VAP15 is consistent with the input impedance of the variable impedance power combiner VI-PC. The characteristic impedance of each of the LI-VAP0-LI-VAP15 is consistent with the output impedance of the variable impedance power divider VI-PD. One BTVAP is shared between a plurality of beam signal channels, so that the system areas can be reduced and the costs can be reduced. In addition, a size of a true time delay circuit at a low impedance is also greatly reduced, and there is no obvious change in insertion loss.

Figure 9:
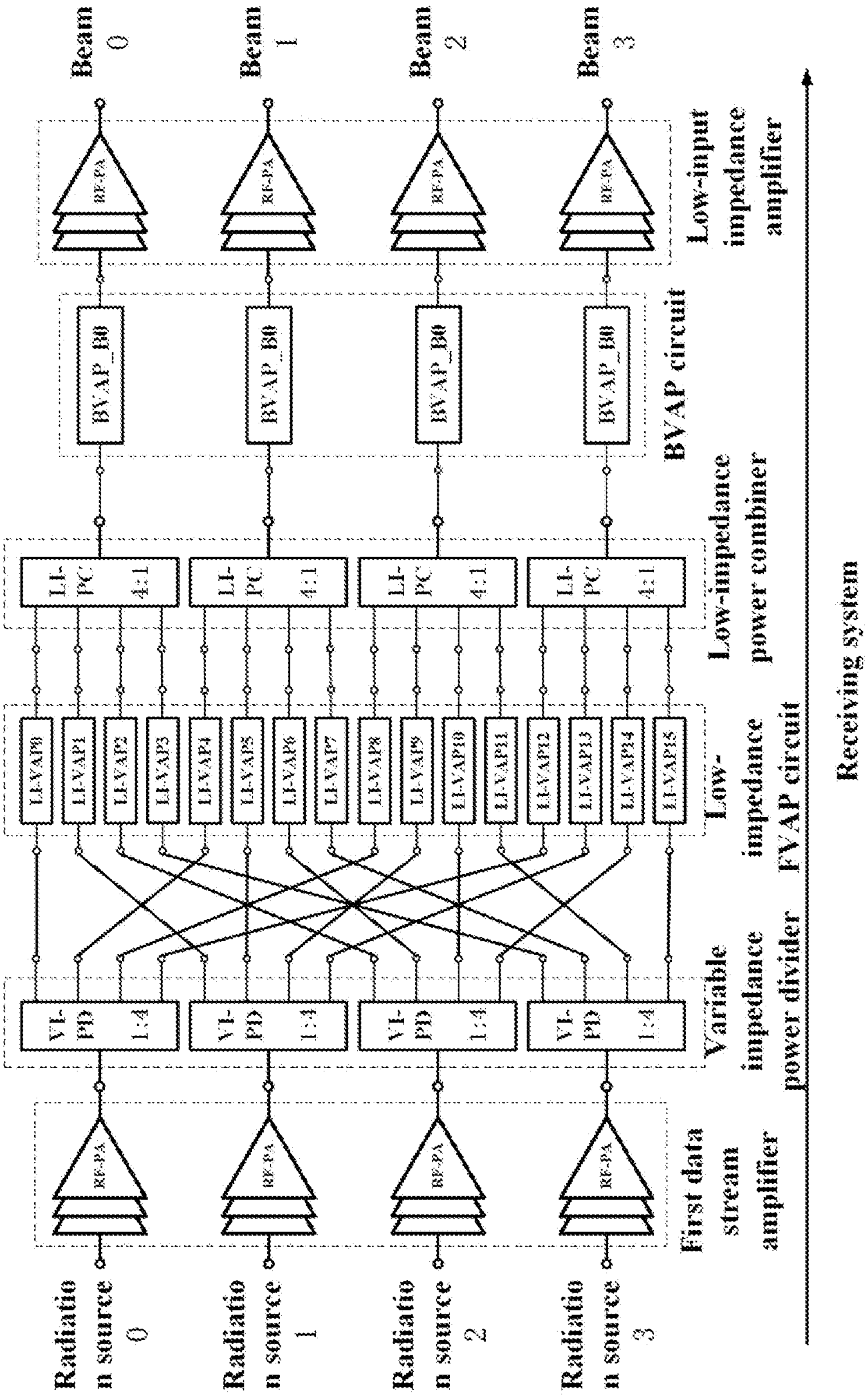
FIG. 9 is a schematic diagram of a receiving system circuit structure based on impedance transformation with an amplifier of a hybrid multi-beamforming circuit structure according to the present invention.
Figure 11:
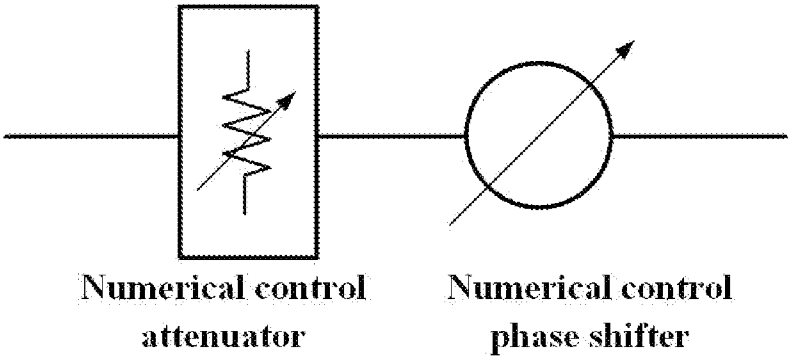
FIG. 11 is a schematic diagram of a numerical control attenuation phase shifter circuit structure with FTVAP of a hybrid multi-beamforming circuit structure according to the present invention.

As shown in FIG. 9, a receiving system circuit structure of a hybrid multi-beamforming circuit structure with an amplifier and impedance transformation is provided, based on the circuit structure shown in FIG. 3, the power divider (PD) is disposed as a variable impedance power divider VI-PD, and an input impedance Z0 of the variable impedance power divider VI-PD is greater than an output impedance Z1 of the variable impedance power divider VI-PD, where Z0=50Ω. A first data stream amplifier is added to signal channels of a radiation source and a variable impedance power divider (VI-PD) to amplify a radiation source signal, and a low-input impedance amplifier is added to signal channels of a BTVAP circuit and a beam to amplify a beam signal. Optional, the variable impedance power divider VI-PD has a single input port and a plurality of output ports, an input impedance is 50Ω, and an output impedance is less than 50Ω. The low-impedance power combiner LI-PC has a plurality of input ports and a single output port, with an input impedance of less than 50Ω and an output impedance of less than 50Ω. An input impedance of the low-input impedance amplifier and an output impedance of the low-impedance power combiner are equal, and a low-impedance FTVAP circuit is fine-tuned as an antenna element, with more accurate amplitude and phase or delay step values, and can be controlled by the numerical control attenuation phase shifter as shown in FIG. 11 and the numerical control attenuation fine time delay circuit as shown in FIG. 12. As the coarse beam tuning, an amplitude and phase or time delay step values of the BTVAP circuit is greater, a circuit area is also larger, and a numerical control attenuation large-step time delay circuit shown in FIG. 13 can be used.

Figure 10:
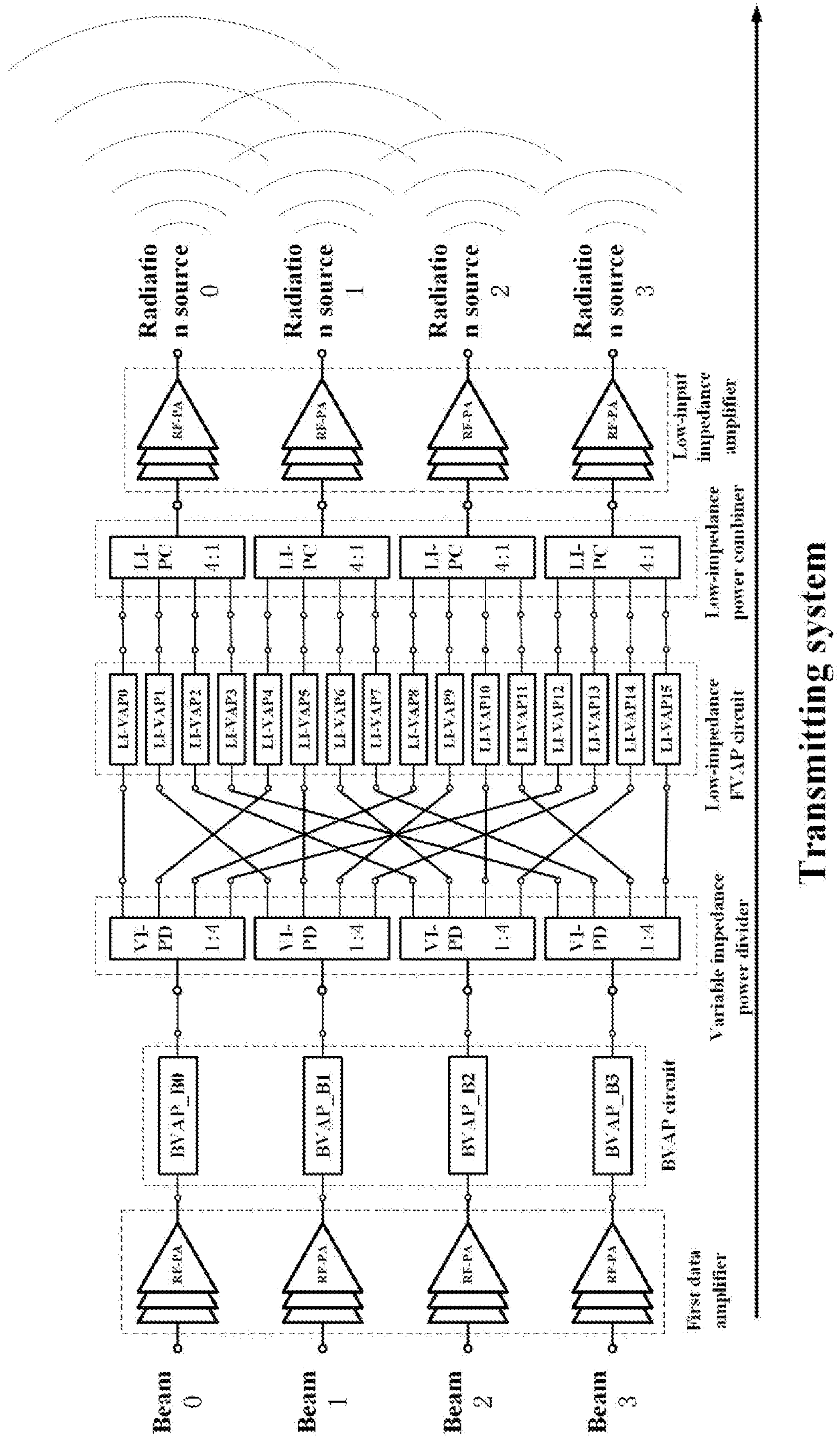
FIG. 10 is a schematic diagram of a transmitting system circuit structure based on impedance transformation with an amplifier of a hybrid multi-beamforming circuit structure according to the present invention.

As shown in FIG. 10, a transmitting system circuit structure of a hybrid multi-beamforming circuit structure with an amplifier and impedance transformation is provided, based on the circuit structure shown in FIG. 4, the power divider (PD) is disposed as a variable impedance power divider VI-PD, and an input impedance Z0 of the variable impedance power divider VI-PD is greater than an output impedance Z1 of the variable impedance power divider VI-PD, where Z0=50Ω. A first data stream amplifier is added to signal channels of beams and the BTVAP to amplify beam signals, and a low-input impedance amplifier is added to signal channels of the low-impedance power combiner and a radiation source to amplify a radiation source signal. Optional, the variable impedance power divider VI-PD has a single input port and a plurality of output ports, an input impedance is 50Ω, and an output impedance is less than 50Ω. The low-impedance power combiner LI-PC has a plurality of input ports and a single output port, with an input impedance of less than 50Ω and an output impedance of less than 50Ω. An output impedance of the low-impedance power combiner and an input impedance of the low-input impedance amplifier are equal, and a low-impedance FTVAP circuit is fine-tuned as an antenna element, with more accurate amplitude and phase or delay step values, and can be controlled by the numerical control attenuation phase shifter as shown in FIG. 11 and the numerical control attenuation fine time delay circuit as shown in FIG. 12. As the coarse tuning, an amplitude and phase or time delay step values of the BTVAP circuit is greater, a circuit area is also larger, and the numerical control attenuation large-step time delay circuit shown in FIG. 13 can be used for coarse beam tuning.

Beneficial effects of the present invention are as follows: according to the needs of signal control, the power divider is placed at a near input port, and the power combiner, tuning with VAP circuits, and the digital control circuit module are placed at a near output port. In addition, based on different impedances of device ports, different impedance transformation modules are selected to be inserted into the structure respectively to reduce the insertion loss and circuit area of the tuning with VAP circuits without unnecessary additional insertion loss. If the insertion loss is not increased, and phase shift accuracy or time delay accuracy of the traditional circuit is not changed, a lower occupied area of the multi-beam system is achieved through tuning with VAP circuits with large-step accuracy or tuning with VAP circuits with small step accuracy, and other performance of the circuit is not changed. Therefore, the structure is simple and proper, which greatly improves an integration degree and reduces costs compared with a same type of circuit. The hybrid multi-beamforming circuit structure of the present invention is used in a phased array to implement multi-beamforming and beam scanning, so that the FTVAP circuit and the BTVAP circuit have lower power consumption under a low impedance condition.

Finally, it should be noted that the foregoing embodiments are merely intended for describing the technical solutions of the present invention other than limiting the present invention. Although the present invention is described in detail with reference to the foregoing embodiments, those of ordinary skill in the art should understand that they may still make modifications to the technical solutions described in the foregoing embodiments or make equivalent replacements to some technical features thereof, without departing from the scope of the technical solutions of embodiments of the present invention.

What is claimed is:

1. A hybrid multi-beamforming circuit structure, comprising:

a power divider, receiving a first data stream for dividing the first data stream into a plurality of second data streams;

a power combiner, receiving the second data streams and combining the plurality of second data streams into a third data stream;

a fine tuning with VAP (FTVAP) circuit, wherein an input port of the FTVAP circuit is connected to an output port of the power divider, and an output port of the FTVAP circuit is connected to an input port of the power combiner, to control an amplitude, a phase, and time delay of the second data streams;

a beam tuning with VAP (BTVAP) circuit, wherein the BTVAP circuit is connected to an input port of the power divider to control an amplitude, a phase, and time delay of the first data stream, or the BTVAP circuit is connected to an output port of the power combiner to control an amplitude, a phase, and time delay of the third data stream; and both the FTVAP circuit and the BTVAP circuit adjust an amplitude through an amplitude modulation circuit, the FTVAP circuit performs phase adjustment through a numerical control phase shifter, the BTVAP circuit performs time delay adjustment through a numerical control true time delay circuit, the FTVAP circuit performs small-step accurate time delay adjustment through the numerical control true time delay circuit, and the BTVAP circuit performs large-step time delay adjustment through the numerical control true time delay circuit.

2. The hybrid multi-beamforming circuit structure according to claim 1, further comprising a first data stream amplifier and a third data stream amplifier, wherein an output port of the first data stream amplifier is connected to the input port of the power divider, an input port of the third data stream amplifier is connected to an output port of the BTVAP circuit, or the output port of the first data stream amplifier is connected to an input port of the BTVAP circuit, and the input port of the third data stream amplifier is connected to the output port of the power combiner.

3. The hybrid multi-beamforming circuit structure according to claim 1, further comprising an impedance transformation circuit, wherein the impedance transformation circuit is cascaded with the power divider to match an output impedance of the power divider with an input impedance of the FTVAP circuit; and the impedance transformation circuit is cascaded with the power combiner to match an output impedance of the FTVAP circuit with an input impedance of the power combiner.

4. The hybrid multi-beamforming circuit structure according to claim 3, wherein an input impedance of the power divider matches an output impedance of the BTVAP circuit, and an output impedance of the power combiner matches a port impedance of the third data stream.

5. The hybrid multi-beamforming circuit structure according to claim 3, wherein an input impedance of the power divider matches a port impedance of the first data stream, and an output impedance of the power combiner matches an input impedance of the BTVAP circuit.

6. The hybrid multi-beamforming circuit structure according to claim 3, further comprising a low-input impedance amplifier, wherein an input port of the low-input impedance amplifier is connected to an output port of the power combiner, an output port of the low-input impedance amplifier is connected to the third data stream or the input port of the low-input impedance amplifier is connected to an output port of the BTVAP circuit, and the output port of the low-input impedance amplifier is connected to the third data stream.

7. The hybrid multi-beamforming circuit structure according to claim 1, wherein the first data stream is a radiation source and the third data stream is a beam, or the first data stream is a beam, and the third data stream is a radiation source.

8. The hybrid multi-beamforming circuit structure according to claim 1, wherein the numerical control true time delay circuit is a T-coils structure.

9. The hybrid multi-beamforming circuit structure according to claim 1, wherein each of a port impedance of the numerical control true time delay circuit, a port impedance of the numerical control phase shifter, and a port impedance of an amplitude modulation circuit is less than 50Ω.

* * * * *